United States Patent
Merchant et al.

(10) Patent No.: US 6,334,182 B2
(45) Date of Patent: *Dec. 25, 2001

(54) SCHEDULING OPERATIONS USING A DEPENDENCY MATRIX

(75) Inventors: Amit A. Merchant; David J. Sager, both of Portland, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/135,170

(22) Filed: Aug. 18, 1998

(51) Int. Cl.⁷ .............................. G06F 15/00; G06F 9/30; G06F 9/40

(52) U.S. Cl. .................. 712/214; 712/205; 712/216; 712/217

(58) Field of Search .................... 712/216, 200, 712/208, 23, 245, 206, 215, 217, 210, 239, 205, 214; 395/706

(56) References Cited

U.S. PATENT DOCUMENTS

| | | | |
|---|---|---|---|
| 5,546,597 | * 8/1996 | Martell et al. ......................... | 712/23 |
| 5,655,096 | * 8/1997 | Branigin ............................... | 712/200 |
| 5,710,902 | * 1/1998 | Sheaffer et al. ...................... | 712/216 |
| 5,737,758 | 4/1998 | Merchant ............................. | 711/146 |
| 5,737,759 | 4/1998 | Merchant ............................. | 711/146 |
| 5,796,975 | * 8/1998 | Lesartre et al. ....................... | 712/218 |
| 5,850,533 | * 12/1998 | Panwar et al. ........................ | 712/216 |
| 5,884,059 | * 3/1999 | Favor et al. .......................... | 712/215 |
| 5,913,925 | * 6/1999 | Kahle et al. .......................... | 712/206 |
| 5,923,862 | * 7/1999 | Nguyen et al. ....................... | 712/208 |
| 6,016,540 | * 1/2000 | Zaidi et al. ........................... | 712/214 |
| 6,216,200 | * 4/2001 | Yeager ................................. | 711/100 |

* cited by examiner

Primary Examiner—Thomas Lee
Assistant Examiner—Chun Cao
(74) Attorney, Agent, or Firm—Kenyon & Kenyon

(57) ABSTRACT

A method and apparatus for scheduling operations using a dependency matrix. A child operation, such as a micro-operation, is received for scheduling. The child operation is dependent on the completion of a parent operation, such as when one of the child operation's sources is the parent operations's destination. An entry corresponding to the child operation is placed in a scheduling queue and the child operation is compared with other entries in the scheduling queue. The result of this comparison is stored in a dependency matrix. Each row in the dependency matrix corresponds to an entry in the scheduling queue, and each column corresponds to a dependency on an entry in the scheduling queue. Entries in the scheduling queue can then be scheduled based on the information in the dependency matrix, such as when the entire row associated with an entry is clear.

15 Claims, 9 Drawing Sheets

SCHEDULING OPERATIONS USING A DEPENDENCY MATRIX

FIELD

The present invention relates to the scheduling of operations in a processor. More particularly, the present invention relates to a method and apparatus for scheduling operations using a dependency matrix.

BACKGROUND

A primary function of a processor is to perform a stream of operations, such as a stream of computer instructions. Some processors are designed to completely perform one operation in the stream before beginning to perform the next operation. With these "in-order" processors, the result of one operation is correctly used by later operations that "depend" on it. Consider the following instructions:

Load memory-1→register-X

Add register-X register-Y→register-Z. The first instruction loads the content of memory-1 into register-X. The second instruction adds the content of register-X to the content of register-Y and stores the result in register-Z. The second instruction is a "child" operation that depends on the first instruction, or "parent" operation. If the result of the first instruction is not stored in register-X before the second instruction is executed, an incorrect result will be stored in register-Z. Note that a single operation may have more than one parent, more than one child, and may be both a parent and a child with respect to different operations.

To improve a processor's performance, operations can be performed "out-of-order." For example, if data for one instruction in a stream is not ready at a particular time, the processor may execute another instruction later in the stream. In this case, a "scheduler" can schedule instructions so that a child instruction will not be performed before its parent instruction. This improves processor performance because the processor does not remain idle until the first instruction's data is ready.

Computer instructions are not the only operations that have such dependencies. For example, memory operations may be scheduled so that information is stored into a memory location before information is read from that memory location by a later operation. Other examples include scheduling operations based on limited execution resources, memory resources, register resources, slot availability or bus availability. By way of example, the scheduling of micro-operations, also known as "μops" or "uops," will be used herein to describe known scheduling techniques.

FIG. 1 is an overview of a known system for processing instructions and uops. The system includes an instruction fetch and decode engine 110 that decodes an instruction stream into a series of in-order ops that represent the data flow of the instruction stream. The instructions can be decoded, for example, into uops with two logical sources and one logical destination. The uops are "issued" from the instruction fetch and decode engine 110 to a renaming and allocation unit 120. If a processor has only a limited number of physical registers, the renaming and allocation unit 120 maps logical register references to physical register references.

The uops are then sent to a scheduler 130, which stores several pending uops and selects from this group, or "queue," the uop or uops that will be performed next. The scheduler 130 selects uops such that a child uop will not be performed before its parent uop. That is, the scheduler 130 decides if every source register used by a uop is ready to be used. If all of the uop's sources are ready, and if execution resources are available, the uop is sent, or "dispatched," to a execution resource 140 where the operation is performed. Thus, uops are dispatched based on data flow constraints and resource availability, not the original ordering of the stream.

Known schedulers are typically based on the "Tomasulo" scheduler. FIG. 2, a block diagram of such a Tomasulo scheduler, shows two issued uops, Add1 and Add2, that have been received by a scheduler 200. Each uop has two sources and a destination. Add1 sums the contents of register 1 (r1) with the contents of r2. The result is stored in r3. Add2 sums the contents of r3 with the contents of r2 and stores the result in r4. As can be seen, Add2 depends on, and is the child of, Add1. The scheduler 200 includes a ten-bit scoreboard 210 that is used to keep track of which registers are ready. Each bit represents a register, and, for example, a "0" indicates that the register is not ready while a "1" indicates that the register is ready. If Add1 has not been executed, the bit associated with r3 in the scoreboard 210 is set to "0," indicating that r3 is not ready.

An active scheduler 220 uses the scoreboard 210 to determine if a uop is ready for dispatch. For example, the active 220 scheduler looks at the bits associated with r3 and r2 when considering Add2. If the scoreboard 210 reflects that both sources are ready, the active scheduler 220 dispatches the uop for execution. If either source is not available, the uop is not dispatched. After the uop is executed, the scoreboard 210 is updated to reflect that 4 is now ready.

FIG. 3 illustrates circuitry associated with a Tomasulo scheduler. When a uop is written, or allocated, into the Tomasulo scheduler, its sources are read from the scoreboard 210. If the scoreboard 210 indicates that the sources are ready, the uop is ready to schedule. Sources that are ready in the scoreboard 210 are marked ready in the scheduler. Sources that are not ready will monitor the result bus. The value of a pending uop's source register 310 is matched against the value of completed uops on the destination, or result, bus using a group of compares 320. The outputs from the group of compares 320 are input to a wide OR 330, and the output of the wide OR is stored as a ready bit 340 for the first source. Similar logic (not shown in FIG. 3) is performed to generate a ready bit for the pending uop's second source. When all of the pending uop's sources are ready, as determined by the output of the logic gate 350, the uop is ready for dispatch. This logic is repeated for each pending uop, such as entries 1 to n. If multiple uops are ready to dispatch, priority logic 360 determines which uop will be dispatched. A lookup is performed to determine the destination register 370 of the dispatching uop, and this value is driven on a result bus.

The Tomasulo scheduler uses a "tight" scheduling loop as shown in FIG. 4. For each pending uop, the scheduler monitors the result bus and compares the destination of executed uops with the pending uop's sources at 410. Next, the scheduler performs ready determination logic 420 to determine the dispatch readiness of the pending uop. For every source used by the pending uop, the results of the comparison performed at 410 are ORed at 430. The results for each source are then ANDed at 440. Only if every source is ready does the scheduler determine that the uop is ready for dispatch.

Several uops may be ready for dispatch at one time. If more than one uop is ready, prioritization is performed at 450 to determine which of the ready uops should be dispatched first. Finally, the pending uop is dispatched at 460. When a uop is dispatched, the scheduler repeats the actions described above, resulting in the tight scheduling loop that determines when pending uops are ready for execution.

There are a number of disadvantages, however, to known scheduling techniques. For example, the basic motivation for increasing clock frequencies is to reduce instruction latency. Suppose that a part of a program contains a sequence of N instructions, $I_1, I_2, \ldots, I_N$. This part of the program may also contain any other instructions. Suppose also that each instruction requires, as an input, the result of the previous instruction. Such a program cannot be executed in less time than $T=L_1+L_2+\ldots+L_N$, where $L_n$ is the latency of instruction $I_n$, even if the processor was capable of executing a very large number of instructions in parallel. Hence, the only way to execute the program faster is to reduce the latencies of the instructions.

Moreover, when each uop in a stream is dependent on the previous uop, a scheduler must perform one full iteration of the tight scheduling loop for each dispatched uop. This becomes the minimum "latency" of each uop. The latency of a uop may be defined as the time from when its input operands are ready until its result is ready to be used by another uop. Additionally, the speed of an instruction through the multi-stage system shown in FIG. 1 is limited by the speed of the slowest unit, or "weakest link," in the chain.

The speed of a processor in uops-per-second, or S, can be expressed as S=P/L, where P is the average parallelism and L is the average uop latency in seconds. A key advantage of a scheduler is that it increases the value P, which improves the processor's performance. However, an execution unit is typically able to execute a common uop, such as an add, with a latency that is less than the latency of the tight scheduling loop. Therefore, the use of the scheduler also increases the value of L, which limits the processor's performance.

For example, comparing the destination register of dispatched uops to all sources of all pending uops may take a long time, such as from 4 to 6 gate operations. This—in addition to the ready determination logic which may take 1 or 2 gates, the prioritization which may take another 1 or 2 gates and destination lookup of 2 or 3 gates—results in a tight loop that takes from 8 to 13 gate operations. Moreover, the scheduler may have to monitor a number of different result buses, which increases the amount of comparing that must be performed. The growing number of registers used in processors, as well as the increasing frequencies of processor operation, make the current system of scheduling operations impractical.

SUMMARY

In accordance with an embodiment of the present invention, an operation to be scheduled in a processor is received. It is determined if the received operation is dependent on the completion of a parent operation, and the received operation is scheduled after the parent operation.

DETAILED DESCRIPTION

Figure 5:
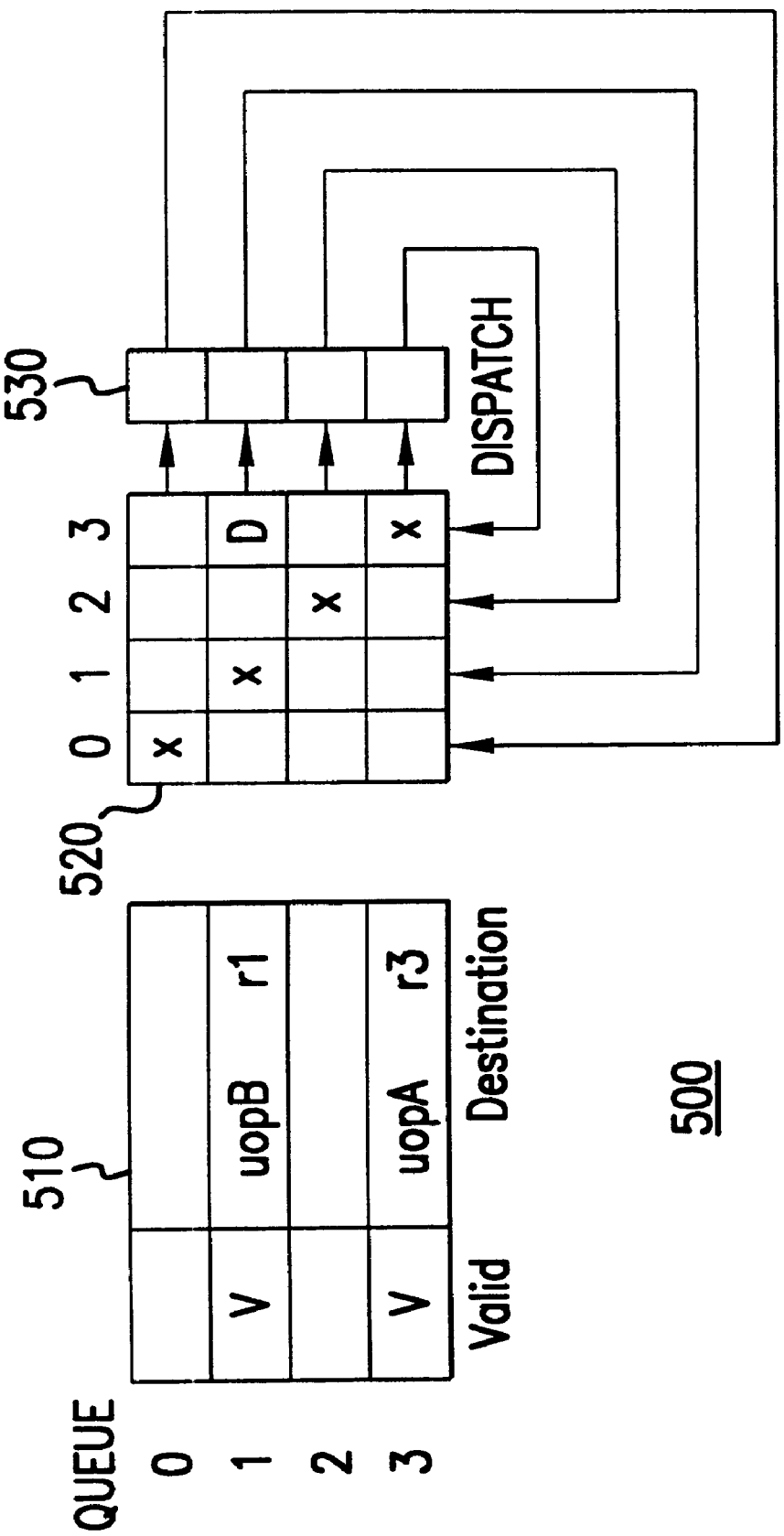
FIG. 5 shows matrix scheduler according to an embodiment of the present invention.

An embodiment of the present invention is directed to a method and apparatus for scheduling operations using a dependency matrix. Referring now in detail to the drawings wherein like parts are designated by like reference numerals throughout, FIG. 5 shows a matrix scheduler 500 according to an embodiment of the present invention. Each uop that enters the matrix scheduler 500 is placed into a position, or entry, in a scheduling queue 510. The matrix scheduler shown in FIG. 5 has 4 such entries, labeled "0" to "3." Each entry includes a valid bit indicating whether or not there is a uop in that position. As indicated by a "V" in FIG. 5, position 1 contains uopB. It will be understood that "V" could represent, for example, a bit having a value of "1." Similarly, position 3 contains uopA and positions 0 and 2 are empty. The scheduling queue 510 also includes a destination register for each entry, and the collection of destination registers is referred to as a "destination register file." As shown in FIG. 5, the result of uopB will be placed in register 1 (r1) and the result of uopA will be placed in r3.

Figure 1:
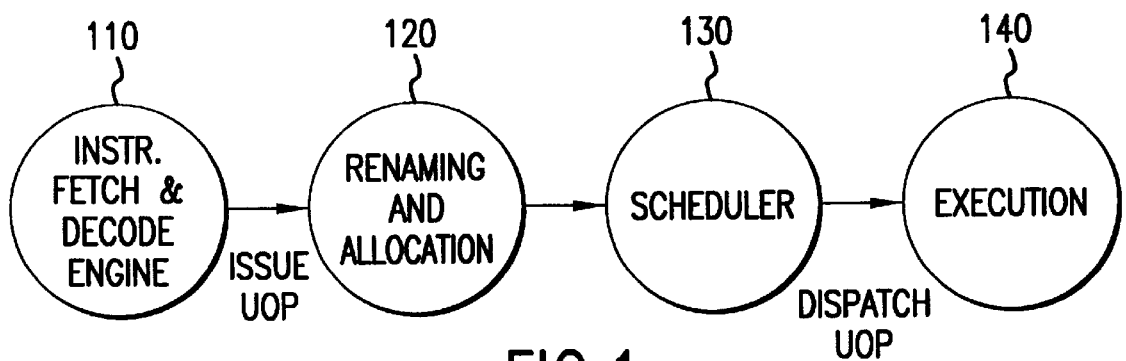
FIG. 1 is an overview of a known system for processing instructions and uops.
Figure 2:
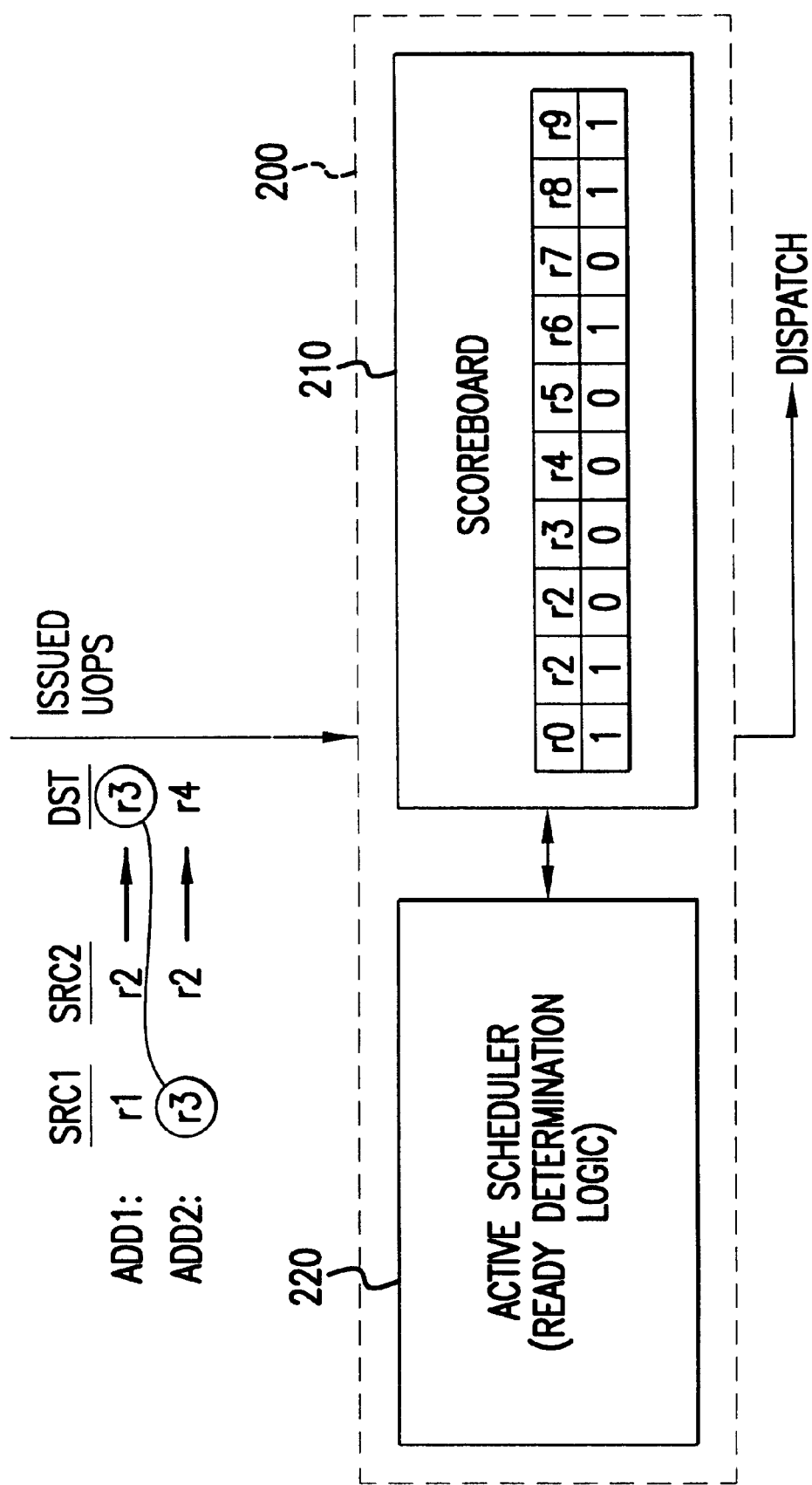
FIG. 2 is a block diagram of a known Tomasulo scheduler that schedules operations in a processor.
Figure 3:
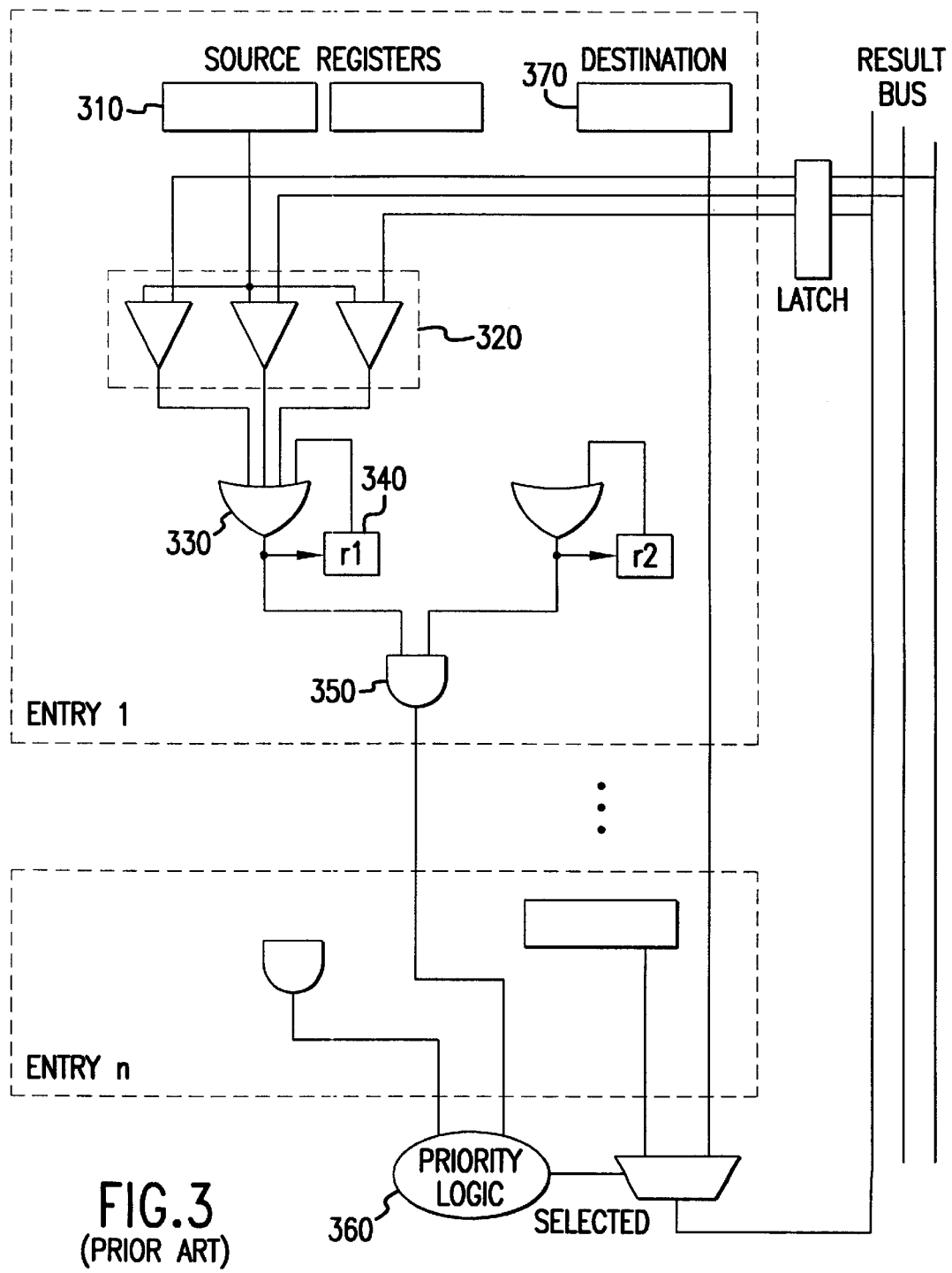
FIG. 3 illustrates circuitry associated with a Tomasulo scheduler.
Figure 4:
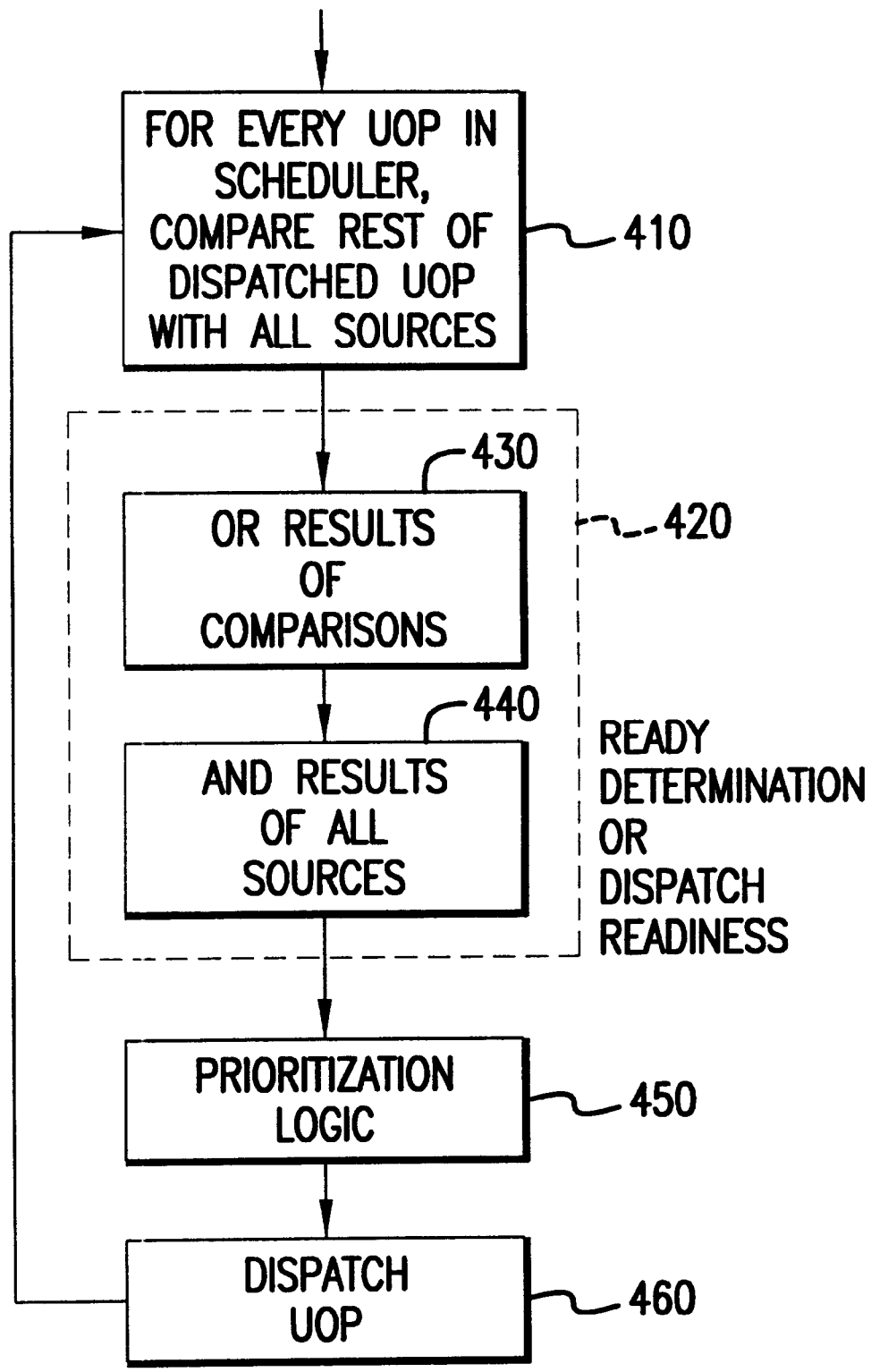
FIG. 4 is a flow diagram of a known method of scheduling operations in a processor.

The stream of entering uops is in-order, so a parent of an entering uop is either pending inside the matrix scheduler 500 or has already been dispatched. That is, a parent uop will never enter the matrix scheduler 500 after its child. If dependencies between entries in the scheduling queue 510 are easily setup and maintained, the time consuming compares in the scheduling loop, as described with respect to FIG. 4, may be eliminated. According to an embodiment of the present invention, this is done using a dependency matrix 520.

Each bit, or element, in the dependency matrix 520 corresponds to the dependency of a uop in one queue position to a uop in another queue position. For example, the "D" in row 1, column 3 indicates that the uop in entry 1, or uopB, is dependent on the result produced by the uop in entry 3, or uopA. That is, uopB uses the destination of uopA, or r3, as a source. It will be understood that "D" could represent, for example, a bit having a value of "1." Because a uop cannot depend on itself, each box along the diagonal of the dependency matrix 520 is marked with an "x." Note that while a dependency matrix having "rows" and "columns" with a specific relationship to dependencies is used herein as an example, other structures, such as a matrix in which the terms "rows" and "columns" are switched, may be used instead.

When a new uop enters the scheduling queue 510, allocation logic determines which available position should be used. The entering uop is then written into that position using write ports (not shown in FIG. 5), and the sources of the entering uop are matched against the destination register file using compare (CAM) ports (also not shown in FIG. 5). A match between an entering uop's source and a pending uop's destination indicates that the entering uop is dependent on the pending entry, and a "D" is stored at the appropriate position in the dependency matrix 520.

In this way, the dependency matrix 520 reflects which uops are ready to dispatch. A uop with any dependency bit set must wait for the parent associated with that bit to dispatch. As shown in FIG. 5, uopA is ready to dispatch, because there is no "D" in row 3, but uopB is not ready because it must wait for its dependency on uopA to resolve, as shown by the "D" in row 1, column 3. The dispatch status of each entry in the matrix scheduler 500, as determined by ready determination logic, may be stored as a dispatch logic bit 530. If a number of uops are ready for dispatch at one time, priority logic may be used to determine which uop will be dispatched first. Finally, deallocation logic determines which entries in the scheduling queue 510 need to be "deallocated," or which positions in the queue are now empty and ready to be used again.

When a uop dispatches, the corresponding column in the dependency matrix 520 is cleared because any bit that was set in that column corresponded to a uop that was dependent on the dispatched uop. As shown by an arrow in FIG. 5, column 3 will be cleared when uopA dispatches. This clears the "D" in row 1, column 3 and sets the stage for uopB to dispatch in the next cycle. This is the scheduling loop for the matrix scheduler 500, and it is faster than the traditional Tomasulo scheduler because the compares and destination lookup shown in FIG. 4 have both been eliminated. The ready determination logic, which merely checks to see if an entire row is clear, can be implemented as a simple wired-OR structure in domino logic. Such a circuit can be designed at very high frequencies.

Figure 6A:
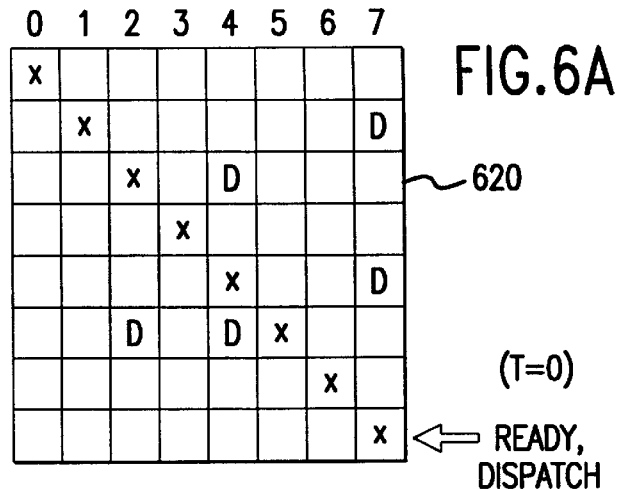
FIGS. 6A to 6C illustrate the use of a dependency matrix to schedule operations according to an embodiment of the present invention.
Figure 6B:
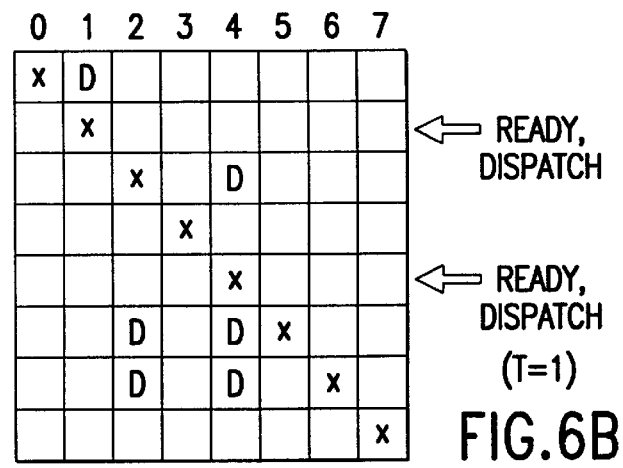
Figure 6C:
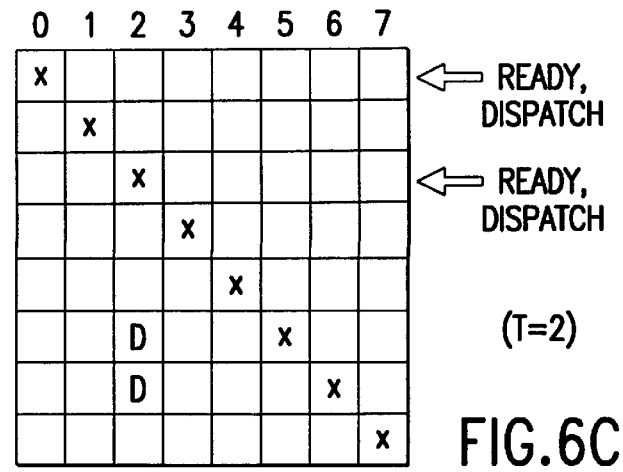

FIGS. 6A to 6C illustrate how uops run through a scheduler having a dependency matrix 620 according to an embodiment of the present invention. As shown in FIG. 6A, the scheduler includes an out-of-order scheduling queue 610 with eight positions, labeled from "0" to "7," but any number of positions can be used. Each position in the scheduling queue 610 contains a validity indication and information about the uop, including the uop's destination. At time T=0 the scheduling queue 610 has five entries with a validity bit set to "V." Thus, for example, queue position 0 is empty and queue position 1 contains an entry which uses register 11 as the destination.

Each row in the dependency matrix 620 corresponds to a position in the scheduling queue 610. Each column in the dependency matrix 620 is associated with a dependency on a position in the scheduling queue 610. As before, because a uop cannot depend on itself, each box along the diagonal of the dependency matrix 620 is marked with an "x." The "D" at row 1, column 7 indicates that the uop in queue position 1 depends on the uop in queue position 7. That is, the operation in queue position 1 is the child of the operation in queue position 7. Of the five entries in the scheduling queue 610, only the entry in queue position 7 does not depend on any other entry. Thus, only the entry in queue position 7 is labeled "ready" and can be dispatched by the scheduler.

Now consider two newly issued uops that are ready to be placed in the scheduling queue 610. The first source of the first uop ($S_{11}$) is register 11 and the second source ($S_{12}$) is register 2. The destination of the first uop ($D_1$) is register 17. That is, the first uop uses registers 11 and 2 to create a value that is placed in register 17. The first source of the second uop ($S_{21}$) is register 14, the second source ($S_{22}$) is register 12 and the destination ($D_2$) is register 19. The scheduling queue 610 and dependency matrix 620 shown in FIG. 6A use, for illustration purposes, a superscalar processor that can process two uops simultaneously. In this way, two uops can be allocated into the scheduler, and two uops can be scheduled, in any one cycle. The first uop is being placed into queue position 0, although it could instead have been placed in queue position 3, for example. The second uop is being placed into queue position 6.

Referring now to FIG. 6B, at time T=1 the entry in queue position 7 has been dispatched and the position is now empty. Note that column in the dependency matrix 620 associated with queue position 7, or column 7, has also been cleared and the "D" at rows 1 and 4 have been removed. This is because any child operation that depends on the dispatched uop no longer needs to wait for that destination to become ready. Thus, each time an entry in the queue is dispatched the entire column in the matrix associated with that entry is cleared. Because column 7 has been cleared, two new entries in rows 1 and 4 are now ready for dispatch.

When a uop enters the scheduler, dependency is recorded in the form of the dependency matrix 620. Since the uop that was placed in queue position 0 has register 11 as a source, the bit in the matrix associated with queue position 1 is set to "D." This is because queue position 1 has register 11 as its destination and therefore the uop in position 0, which needs to use the value of register 11, should not be performed before the uop in position 1. The uop that was entered into queue position 0 also has register 2 as a source, but no entry in the queue has register 2 as a destination. Therefore, the value in register 2 is already valid, and no dependency is created. With respect to the uop that was entered into queue position 6, the boxes in columns 2 and 4 are flagged to note the dependency on registers 14 and 12, respectively.

Time T=2 is shown in FIG. 6C. The uops in queue positions 1 and 4 have been dispatched, and the two columns associated with those entries have been cleared. The uop that was placed in queue position 0 is therefore ready for dispatch. The uop that was placed in queue position 5 and 6, however, still depends on the entry in queue position 2, because they need to use the value in register 14 as a source.

Note that in a superscalar processor, where 2 uops can arrive at the scheduler simultaneously, care must be taken in case a parent arrives in one channel at the same time its child arrives in another channel. In this case, the entering child uop will not find its parent in the scheduling queue 610, but this information is still needed to correctly setup the dependency matrix 620. In this case, it is necessary to perform dependency checks between concurrent uops as they are placed in the dependency matrix 620. The program order guarantees that only the later uop's sources must be compared to the earlier uop's destination, so the compare does not need to be performed both ways. The result of the compare, or concurrency bit, can then be factored in when setting up the dependency matrix 620.

Figure 7:
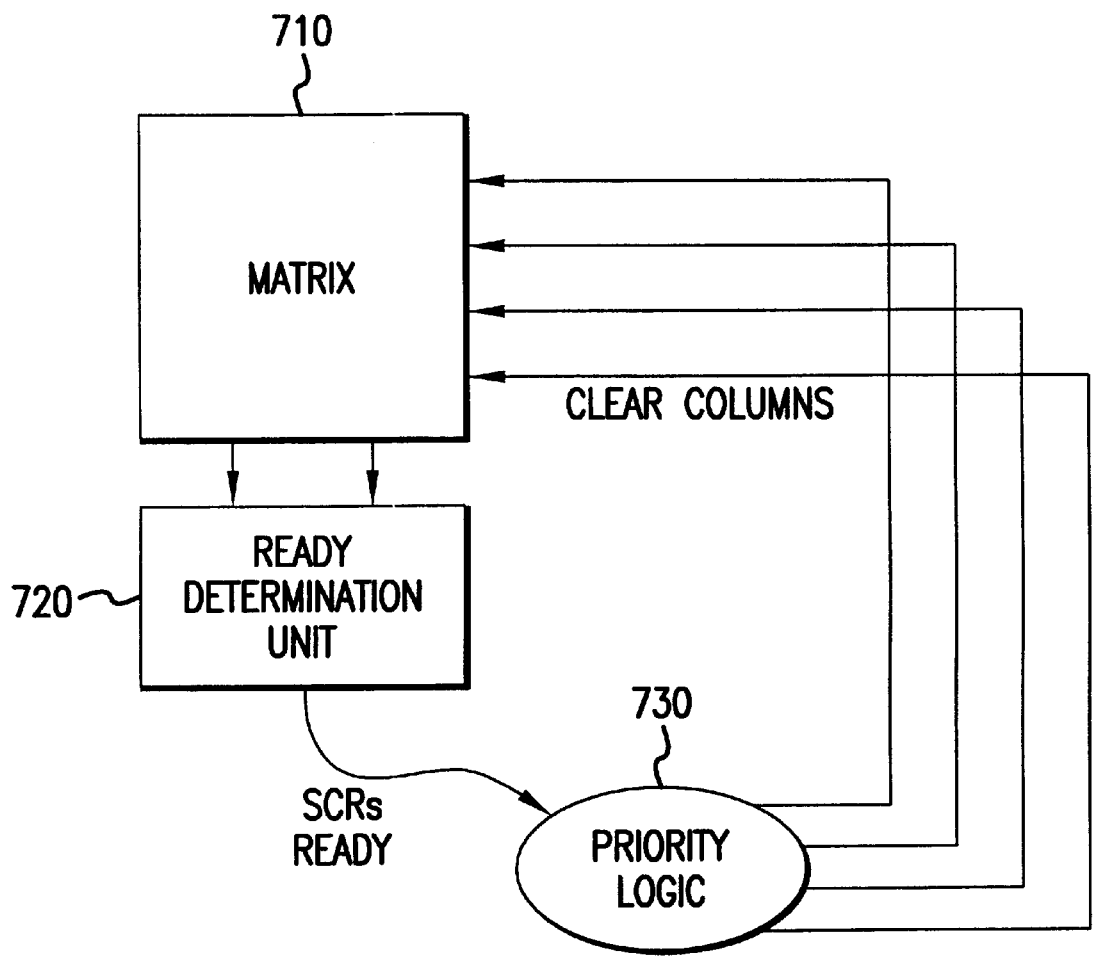
FIG. 7 is a block diagram of scheduling circuitry according to an embodiment of the present invention.

FIG. 7 is a block diagram of scheduling circuitry according to an embodiment of the present invention. The circuitry includes a dependency matrix 710 coupled to a ready determination unit 720. The ready determination unit 720 detects if all of the bits in a row are cleared. If the ready determination unit 720 detects that all of the bits in a row are cleared, the operation associated with that row is ready for dispatch. When more than a single operation is ready, priority logic 730 determines which of the ready operations should be scheduled. The dispatched operations also clear the associated column in the dependency matrix 710, because other entries no longer need to wait for the dispatched entry.

Figure 8:
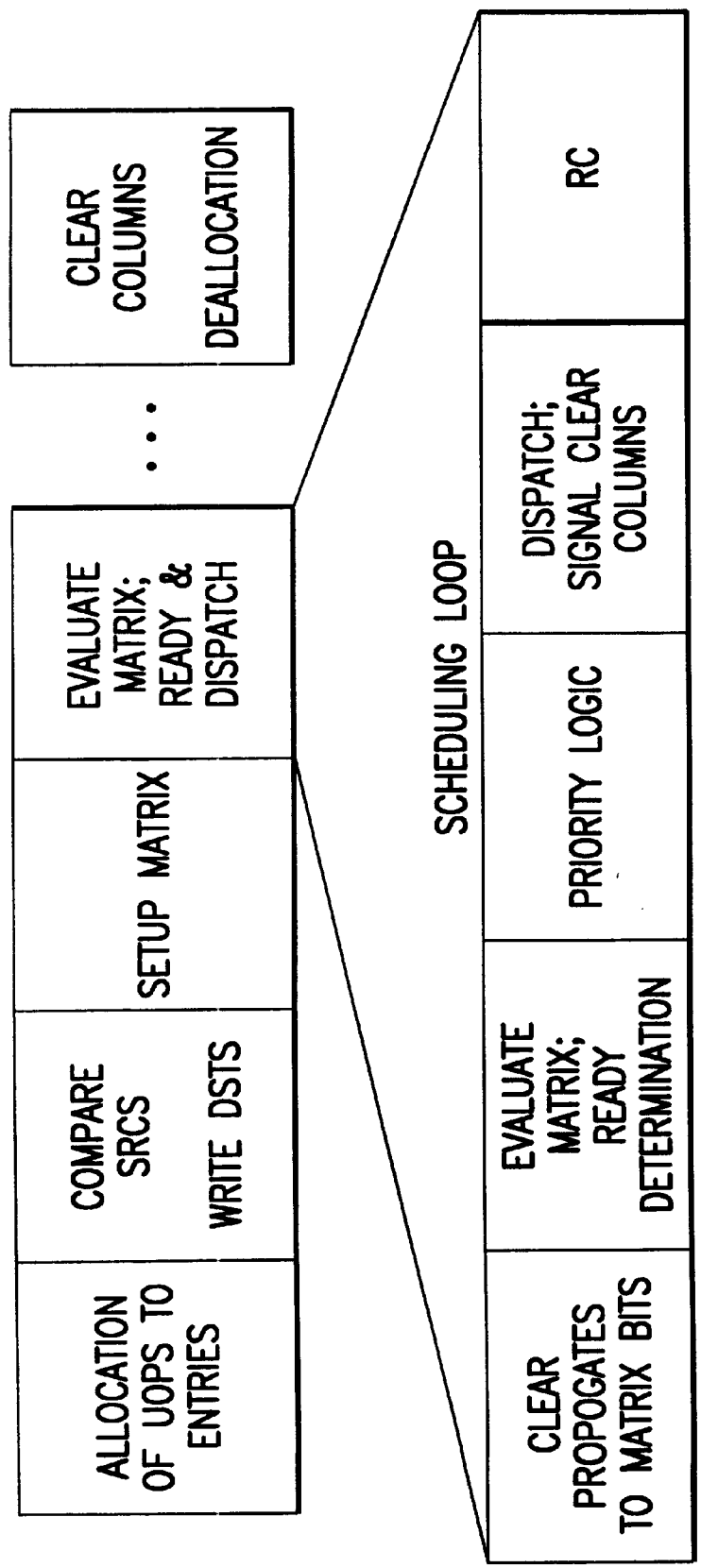
FIG. 8 illustrates a five stage pipeline for a matrix scheduler according to an embodiment of the present invention.

Referring now to FIG. 8, which illustrates a five stage pipeline for a matrix scheduler according to an embodiment of the present invention, the first stage of the pipeline allocates uops to queue positions in the scheduler. Empty slots are determined based on the deallocation of positions in the previous cycle, and it is decided how many uops can be allocated, if any. Incoming uops are assigned to free positions in the queue and appropriate write vectors are produced to be used in the next stage of the pipeline.

In the second stage of the pipeline, the sources of incoming uops are compared to the existing destination register file and the results of the compares are stored for use in the next stage. Simultaneously, the destinations are written into the allocated entries using the write vectors generated during the last stage. Since the valid bits for the newly written destinations have not been written, sources may not be compared against newly written destinations.

In the third stage of the pipeline, compare results are used to setup the matrix for the newly written entries. The valid bits are then written to enable evaluation of the matrix in the next cycle.

The fourth stage of the pipeline is the scheduling loop. Any column clears, caused by dispatched uops, are propagated to the matrix bits. Each row is then evaluated for readiness. If a uop is not ready, the evaluation will be performed again in the next cycle. If a uop is ready, it is prioritized against other ready uops for dispatch. Once the uop is ready to dispatch, a dispatch vector is sent to the register file to read the necessary information and to deallocate the entry. This also produces a signal that clears the corresponding columns in the matrix, allowing any children, or dependent uops, to prepare for dispatch in subsequent cycles.

The fifth stage of the pipeline is the deallocation of the previously dispatched entries from the scheduler. This stage also simultaneously reads necessary information from a register file to be sent to the execution units. The information may include, for example, operands, sources, destination registers, immediate values and identifiers.

Figure 9:
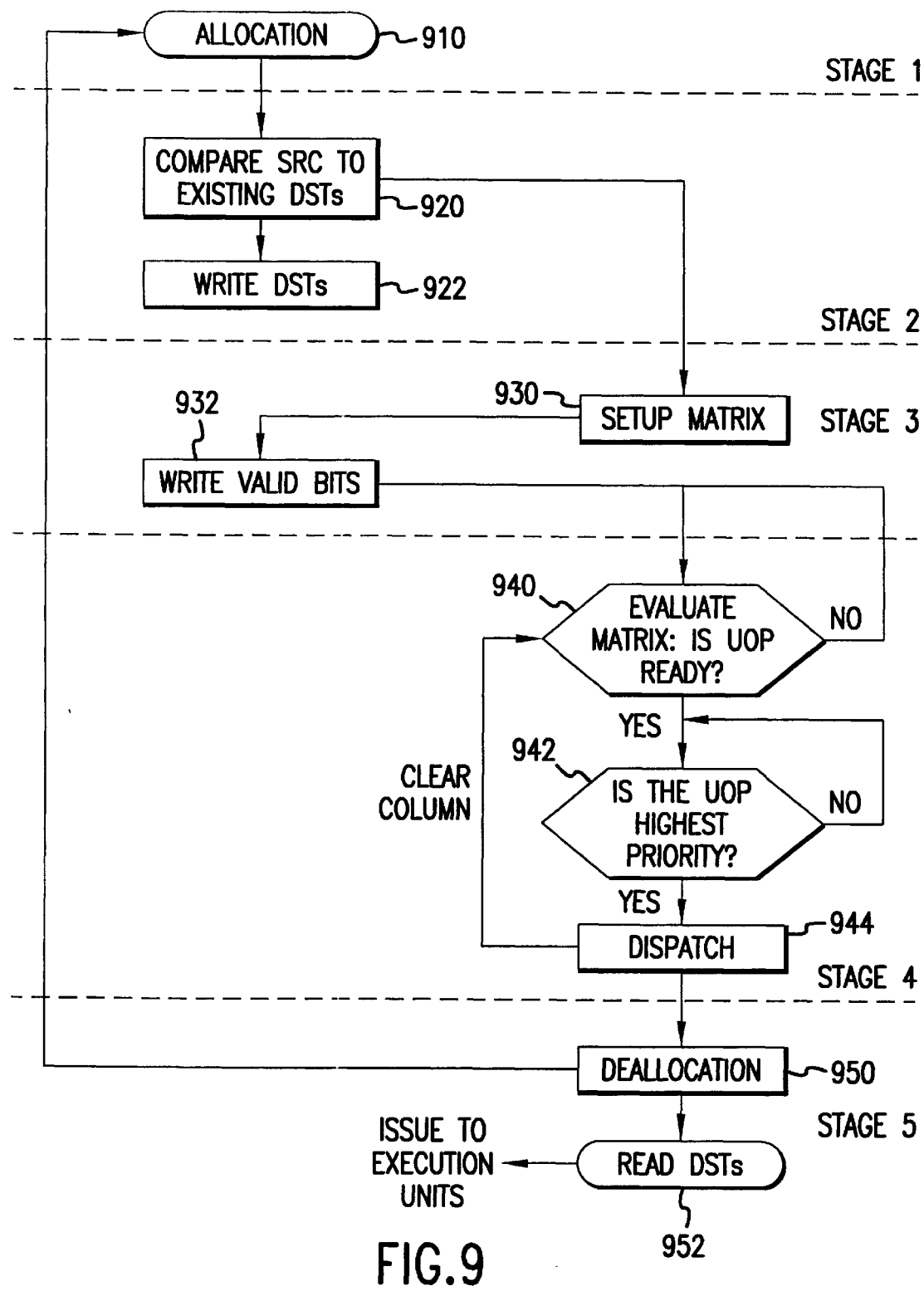
FIG 9 is a flow diagram of a method of scheduling operations according to an embodiment of the present invention.

FIG. 9 is a flow diagram of a method of scheduling operations according to an embodiment of the present invention. Initially, it is determined which entries in the scheduler are empty, or available to store an incoming uop, as indicated at 910. This may, for example, correspond to the first stage of the pipeline shown in FIG. 8.

Referring again to FIG. 9, the sources of new uops are compared against destinations of valid entries already in the scheduling queue at 920, and the compare results, or hits, are logged for further processing. As indicated at 922, the destination, or result, registers are also written into the allocated entry. These actions may correspond to the second stage of the pipeline shown in FIG. 8. The matrix is then setup at 930, and the valid bits are written at 932, using these previously computed bits. These actions may correspond to the third stage of the pipeline shown in FIG. 8.

The matrix is evaluated as indicated at 940 by monitoring dependency bits in the dependency matrix each cycle. If all bits in a uop's row are not clear, the evaluation continues. If all bits in a row are clear, the uop is ready to be dispatched and prioritization is performed at 942. The uop is dispatched at 944 and corresponding columns in the dependency matrix are cleared.

This in turn may allow other uops to dispatch. These actions comprise a scheduling loop according to an embodiment of the present invention, and may correspond to the fourth stage of the pipeline shown in FIG. 8. Next, the uop is deallocated at 950 and the valid bit is reset, allowing the entry to be re-used. At 952, the dispatched uop's information is read out for issue to the execution unit. This may correspond to the fifth stage of the pipeline shown in FIG. 8.

Although various embodiments are specifically illustrated and described herein, it will be appreciated that modifications and variations of the present invention are covered by the above teachings and within the purview of the appended claims without departing from the spirit and intended scope of the invention. For example, although a scheduler for uops was used to illustrate an embodiment of the present invention, it will be appreciated that schedulers for other types of operations will also fall within the scope of the invention. It should similarly be appreciated that the particular architectures described above are illustrative only. Other matrix scheduler architectures will also fall within the scope of the present invention. In addition, although the invention has been described with reference to a specific processor architecture, it is useful in any number of alternative architectures, and with a wide variety of microarchitectures within each. Finally, although software or hardware are described to control certain functions, such functions can be performed using either software, hardware or a combination of software and hardware, as is well known in the art. As is also known, software may be stored on a medium, such as, for example, a hard or floppy disk or a Compact Disk Read Only Memory (CD-ROM), in the form of instructions adapted to be executed by a processor. The instructions may be stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

What is claimed is:

1. A method of scheduling an operation in a processor, comprising:

receiving an operation to be scheduled;

determining if the received operation is dependent on a parent operation;

storing the results of said determination;

scheduling the received operation based at least in part upon the results;

using a ready determination unit for determining if the received operation is ready for dispatch; and scheduling dispatch of the received operation according to a priority logic unit.

2. The method of claim 1, wherein said storing further comprises:

storing the results of said determination in a dependency matrix; and wherein said scheduling is performed based on information stored in the dependency matrix.

3. A method of scheduling an operation in a processor, comprising:

receiving a first operation to be scheduled;

placing an entry corresponding to the first operation in a scheduling queue;

comparing the first operation with other entries in the scheduling queue to determine if another entry corresponds to a parent operation of the first operation;

storing the result of said comparison in a dependency matrix;

scheduling the entry in the scheduling queue based at least in part upon on the information stored in the dependency matrix;

using a ready determination unit for determining if the scheduled entry is ready for dispatch; and scheduling dispatch of the scheduled entry according to a priority logic unit.

4. The method of claim 3, wherein the dependency matrix has rows and columns, each row corresponding to an entry in the scheduling queue and each element in each column corresponding to a dependency on an entry in the scheduling queue.

5. The method of claim 4, wherein said storing comprises storing an indication of dependency in the row associated with the first operation and the column associated with the parent operation.

6. The method of claim 5, wherein said scheduling comprises scheduling an entry in the scheduling queue if the row associated with the entry contains no element indicating dependency.

7. The method of claim 3, further comprising:

removing a dispatched entry from the scheduling queue when the operation associated with the dispatched entry has been performed; and clearing the column in the dependency matrix associated with the dispatched operation.

8. The method of claim 3, wherein the operations are micro-operations.

9. The method of claim 3, further comprising:

prioritizing ready entries in the scheduling queue when more than one entry is ready to be scheduled.

10. A method of scheduling a micro-operation in a processor, the newly issued micro-operation having a source and a destination, comprising:

allocating the micro-operation to an entry in a scheduling queue;

comparing the source of the allocated micro-operation with destinations of pending microoperations in the scheduling queue;

setting up a dependency matrix row associated with the entry of the allocated micro-operation based on the results of said comparison, each column in the dependency matrix being associated with an entry in the scheduling queue; and using a ready determination unit for determining if the allocated micro-operation is ready for dispatch based on the information in the dependency matrix row associated with that entry; and scheduling a dispatch order for the allocated micro-operation according to a priority logic unit.

11. The method of claim 10, further comprising:

dispatching the allocated micro-operation for execution if said determination determines that the allocated micro-operation is ready for dispatch;

clearing the column in the dependency matrix associated with the dispatched operation when the dispatched operation has been performed; and deallocating the entry in the scheduling queue associated with the dispatched operation.

12. The method of claim 10, wherein said determining and dispatching are repeated when any operation is removed from the scheduling queue.

13. An article of manufacture comprising a computer-readable medium having stored thereon instructions adapted to be executed by a processor, the instructions which, when executed, cause the processor to schedule an operation by:

receiving an operation to be scheduled;

determining that the received operation is dependent on the completion of a parent operation;

scheduling the received operation based at least in part upon said determining;

using a ready determination unit for determining if the received operation is ready for dispatch; and scheduling dispatch of the received operation according to a priority logic unit.

14. The article of claim 13, wherein determining further comprises:

storing the results of said determination in a dependency matrix; and wherein said scheduling is performed based on information stored in the dependency matrix.

15. An article of manufacture comprising a computer-readable medium having stored thereon instructions adapted to be executed by a processor, the instructions which, when executed, cause the processor to schedule an operation by:

receiving a first operation to be scheduled;

placing an entry corresponding to the first operation in a scheduling queue;

comparing the first operation with other entries in the scheduling queue to determine if another entry corresponds to a parent operation of the first operation;

storing the result of said comparison in a dependency matrix;

scheduling an entry in the scheduling queue based on the information stored in the dependency matrix;

using a ready determination unit for determining if the scheduled entry is ready for dispatch; and scheduling dispatch of the scheduled entry according to a priority logic unit.

* * * * *